United States Patent [19]

Gill

[11] 4,264,003
[45] Apr. 28, 1981

[54] FOLDABLE UNLOADING MACHINE HAVING FULL CIRCLE SWIVELLING ACTION

[75] Inventor: Charles B. Gill, San Mateo, Calif.

[73] Assignee: Fruehauf Corporation, Detroit, Mich.

[21] Appl. No.: 74,719

[22] Filed: Sep. 12, 1979

[51] Int. Cl.³ .............................................. B65G 63/00
[52] U.S. Cl. .................................. 198/509; 198/587; 198/700; 414/144
[58] Field of Search ............... 198/307, 314, 317, 509, 198/560, 586, 587, 588, 700; 414/133, 144, 145

[56] References Cited

U.S. PATENT DOCUMENTS

| | | | |
|---|---|---|---|
| 1,707,984 | 4/1929 | Kaltenbach . | |
| 2,651,423 | 9/1953 | Rose et al. . | |
| 3,144,142 | 8/1964 | Wallace | 414/145 |
| 3,392,818 | 7/1968 | Baschant . | |
| 3,688,893 | 9/1972 | Wallace | 198/700 X |
| 3,828,915 | 8/1974 | Cox et al. . | |
| 3,926,301 | 12/1975 | Herms . | |

OTHER PUBLICATIONS

"PACECO Bulk Handling Equipment" Brochure May 1977.

*Primary Examiner*—Jeffrey V. Nase
*Attorney, Agent, or Firm*—Burmeister, York, Palmatier, Hamby & Jones

[57] ABSTRACT

The disclosed unloading machine is especially well adapted for unloading bulk materials from ships. The machine swivels around a full circle, to afford maximum coverage to take the bulk material. The illustrated machine comprises an endless bucket train, a vertical supporting leg including first and second parallel guide tubes means whereby the bucket train digs the bulk material and carries it upwardly within the second guide tube, means for receiving the bucket train from the upper end of the second guide tube and for dumping the bulk material, whereupon the bucket train is directed downwardly into the upper end of the first guide tube, swivel supporting means for supporting the leg for swivelling rotation about a first vertical axis through a full circle, the bulk material dumped by the bucket train being received by a first chute which delivers the material to a second chute having a first swivel joint between the second chute and the leg, and a second swivel joint between the lower portion of the second chute and a conveyor which carries away the bulk material. The second swivel joint has a second vertical swivel axis which is spaced laterally from the first swivel axis, whereby the conveyor can be slewed as the leg is swivelled through a full circle, to avoid interference between the conveyor and the leg. First and second power means are provided to produce swivelling movement at the first and second swivel joints. The second chute preferably has a C-shaped arcuate mouth for receiving the bulk material over a wide range of swivelling movement.

16 Claims, 18 Drawing Figures

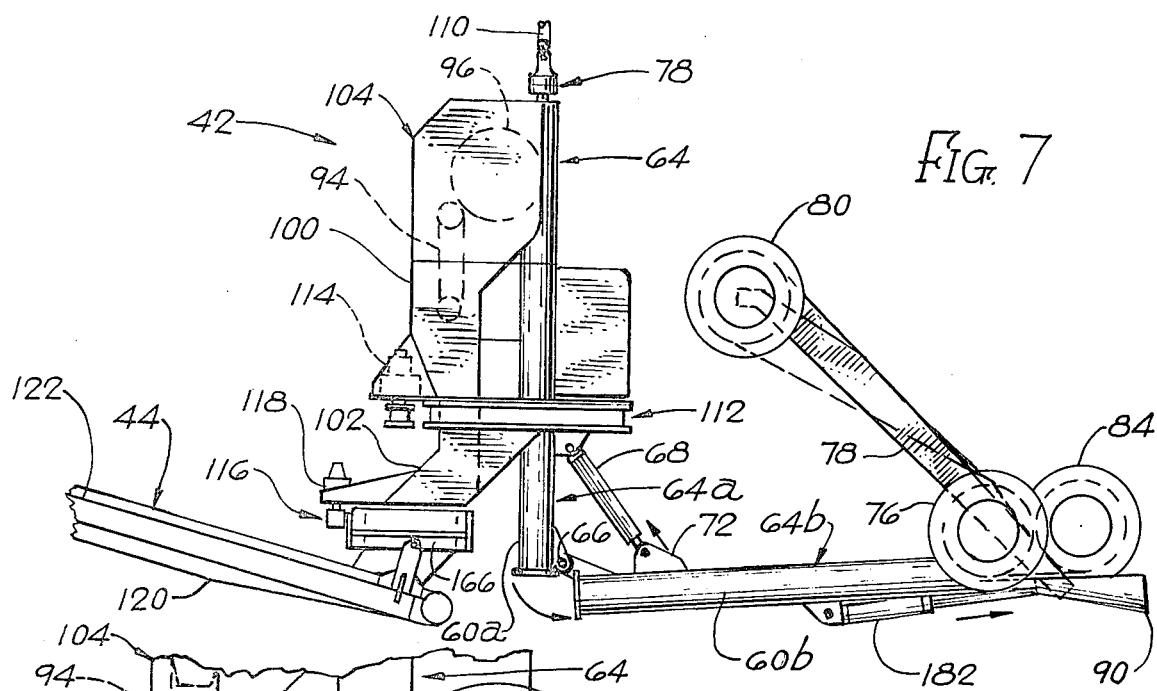
FIG. 7
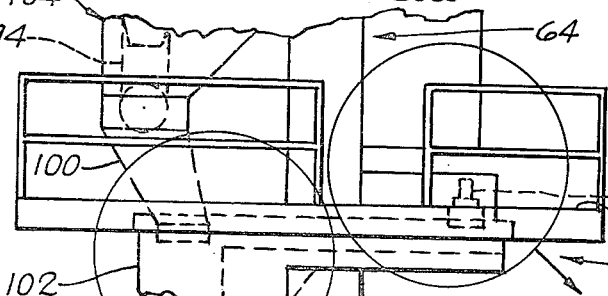
FIG. 8
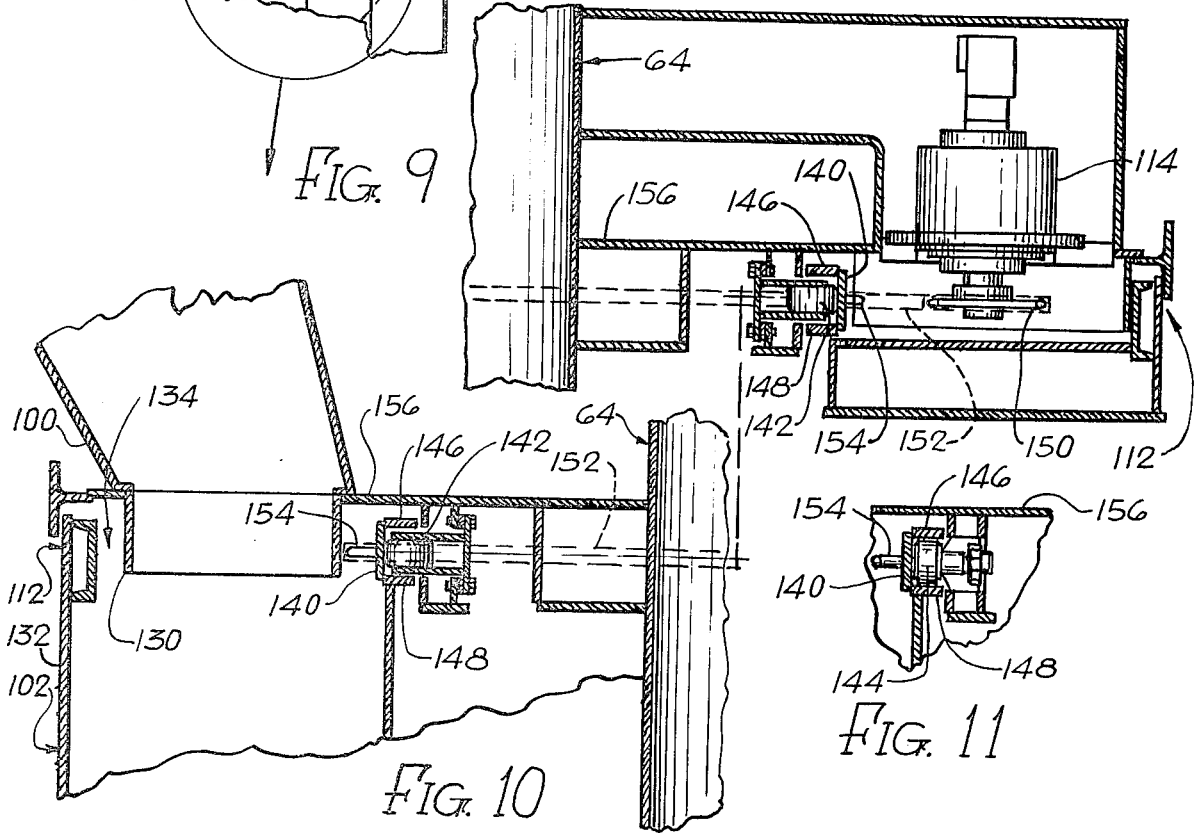
FIG. 9
FIG. 10
FIG. 11

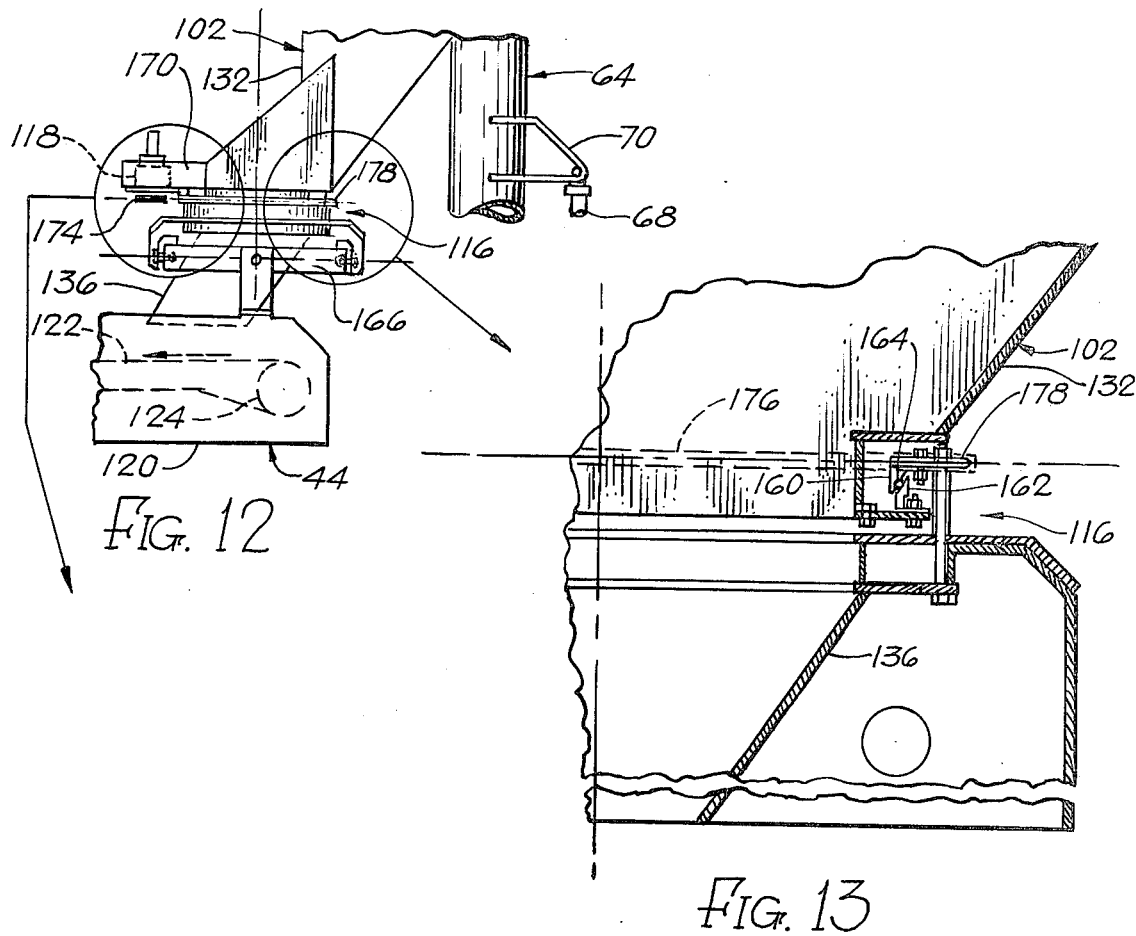
FIG. 12
FIG. 13
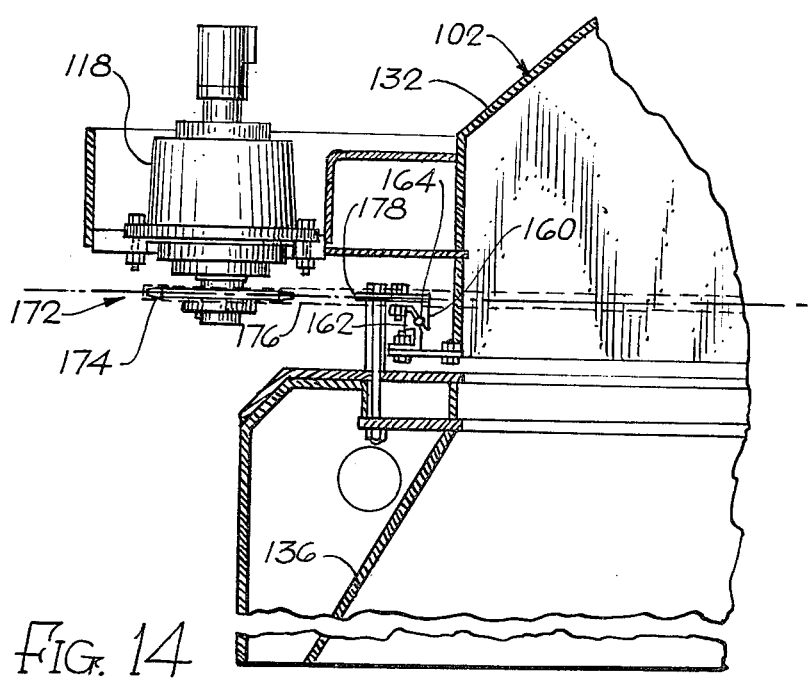
FIG. 14

FOLDABLE UNLOADING MACHINE HAVING FULL CIRCLE SWIVELLING ACTION

This invention relates to an unloading machine for bulk materials, such as granular, powdered or other loose material, for example. The unloading machine will find many applications, but is particularly well adapted for unloading a bulk material from the hold of a ship or the like.

One object of the present invention is to provide a new and improved unloading machine which is foldable to reduce its vertical height, and thereby to facilitate the insertion and removal of the machine, into and out of a ship's hold or the like.

A further object is to provide a new and improved unloading machine which is capable of swivelling through a full circle, so as to maximize the coverage or reach of the machine, so that the machine will be capable of unloading the maximum possible proportion of the bulk material from a ship's hold, without any manual or other outside assistance.

To accomplish these and other objects, the present invention provides an unloading machine comprising an endless bucket train having a plurality of longitudinally spaced buckets which are circular in cross section, the bucket train including a plurality of flexible tension elements extending axially between the successive buckets in the train, a generally vertical supporting leg including first and second parallel guide tubes for receiving and guiding the bucket train which is movable downwardly within the first guide tube and upwardly within the second tube, a digging mechanism connected to the lower end portion of the leg for causing the bucket train to travel outwardly from the lower end of the first guide tube and then downwardly and inwardly to dig bulk material which is then carried upwardly in the buckets into the lower end of the second guide tube, a dumping mechanism connected to the upper end portion of the leg for causing the bucket train to travel out of the upper end of the second tube and then downwardly to dump the bulk material from the bucket train which is then returned to the upper end of the first guide tube. To make the machine foldable, the leg comprises upper and lower sections with a hinged joint therebetween to provide for upward folding movement of the lower section about the hinged joint, each of the guide tubes having upper and lower sections on the upper and lower sections of the leg, the lower section of the leg being swingable about the hinged joint between a downwardly extended position in which the lower sections of the tubes are aligned with the upper sections thereof and an upwardly folded position in which the lower sections of the tubes are swung into angular positions relative to the upper sections of the tubes, the machine being more compact vertically when the lower section of the leg is in its folded position. To provide for full circle swivelling, the machine comprises swivel supporting means for supporting the leg for swivelling rotation about a first generally vertical swivel axis whereby the digging mechanism is swingable along a horizontal circular path, a first chute secured to the leg and rotatable therewith for receiving the bulk material dumped from the bucket train by the dumping mechanism, a second chute having an upper portion for receiving the bulk material from the lower portion of the first chute, a first swivel joint connected between the leg and the upper portion of the second chute to provide for swivelling movement of the leg relative to the second chute about the generally vertical swivel axis, a conveyor for receiving and carrying away the bulk material from the lower end portion of the second chute, and a second swivel joint connected between the lower end portion of the second chute and the conveyor to provide for swivelling rotation therebetween about a second generally vertical swivel axis which is spaced laterally from the first generally vertical swivel axis, whereby the conveyor can be slewed to avoid interference between the conveyor and the leg when the leg is swivelled about its generally vertical swivel axis.

The second chute preferably has an upper mouth portion forming an arcuate generally C-shaped mouth centered about the first swivel axis whereby the mouth is opposite the lower end of the first chute for receiving the bulk material therefrom throughout a wide range of swivelling movement between the leg and the second chute. Preferably, the second chute converges downwardly from the C-shaped mouth to a lower spout portion which extends through the second swivel joint to deliver the bulk material to the conveyor.

Preferably, the conveyor comprises a generally horizontal conveyor structure supporting an endless conveyor belt for receiving the bulk material from the spout portion, the second swivel joint being connected between the conveyor structure and the second chute.

Each of the swivel joints preferably includes antifriction bearing means for reducing the effort required to produce swiveling movement at the swivel joints. More specifically, each swivel joint preferably includes antifriction roller elements and an annular bearing race for engaging the roller elements.

The machine preferably includes first power means for producing swivelling movement at the first swivel joint between the leg and the second chute, and second power means for producing swivelling movement at the second swivel joint between the second chute and the conveyor.

The machine preferably includes power means for moving the lower section of the leg between its extended and folded positions, such power means preferably taking the form of a hydraulic cylinder or some other fluid pressure operated device.

Preferably, the machine comprises upper and lower bracket members projecting outwardly from the upper and lower sections of the leg, the hydraulic cylinder being pivotally connected between such upper and lower bracket members.

The digging mechanism preferably comprises a vertically swingable boom having an inner end with a pivotal connection to the lower end portion of the leg. A first conveyor wheel is preferably supported in the locality of the pivotal connection for causing the bucket train to travel out of the lower end of the first guide tube and then outwardly along the boom. A second conveyor wheel is preferably rotatably mounted on the outer end portion of the boom for supporting the bucket train and causing it to be directed downwardly. A third conveyor wheel is preferably disposed near the lower end of the second guide tube for directing the bucket train into the lower end thereof. The bucket train is preferably suspended in a catenary curve between the second and third conveyor wheels for digging a bulk material and carrying it upwardly in the buckets within the second guide tube.

The dumping mechanism preferably comprises a fourth conveyor wheel disposed near the upper end portion of the leg for receiving the bucket train from the upper end of the second guide tube and carrying the bucket train downwardly to dump the bulk material from the buckets. A fifth conveyor wheel is preferably provided for receiving the bucket train from the fourth conveyor wheel and again directing the bucket train upwardly. A sixth conveyor wheel is preferably provided for receiving the bucket train from the fifth conveyor wheel and directing the bucket train downwardly into the upper end of the first guide tube.

The machine preferably comprises additional power means for swinging the boom about its pivotal connection to the lower end of the leg, such additional power means preferably taking the form of a hydraulic cylinder or some other fluid pressure actuated means.

In certain aspects, this invention is an improvement over the machines disclosed and claimed in the following United States patents, issued on applications of Walter J. Wallace, Jr.: U.S. Pat. No. 3,688,893, issued Sept. 5, 1972, entitled "Materials Handling Machine"; U.S. Pat. No. 3,378,130, issued Apr. 16, 1968, entitled "Unloading Machine for Tankers or the Like"; U.S. Pat. No. 3,282,445, issued Nov. 1, 1966, entitled "Tanker Unloading System"; and U.S. Pat. No. 3,144,142, issued Aug. 11, 1964, entitled "Self-Unloading Cargo Ship".

Further objects, advantages and features of the present invention will appear from the following description, taken with the accompanying drawings, in which.

Figure 4:
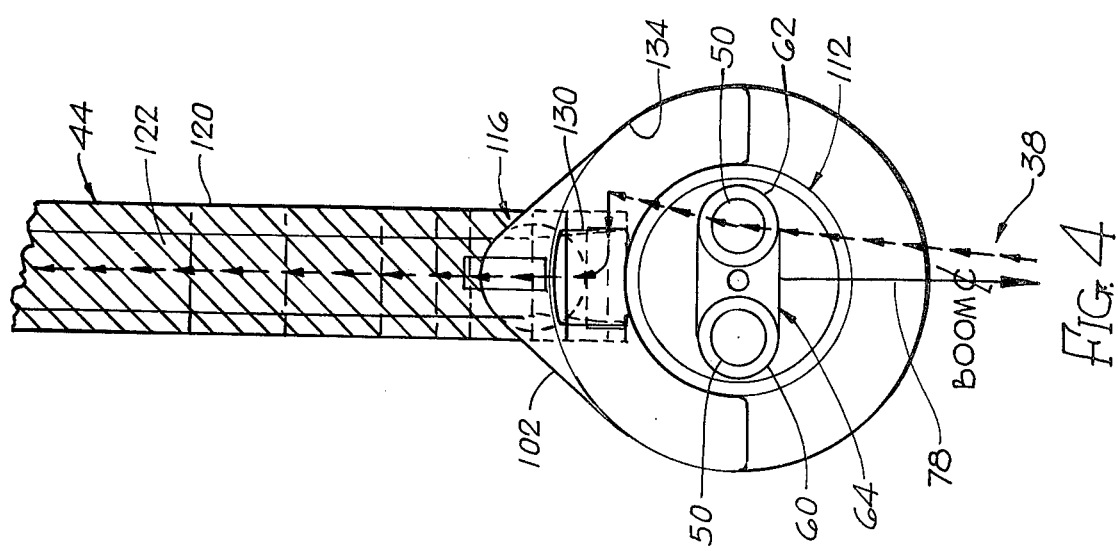

Specifically, FIG. 4 shows the machine with the boom of the digging mechanism in its central or forwardly extending position.

Figure 5:
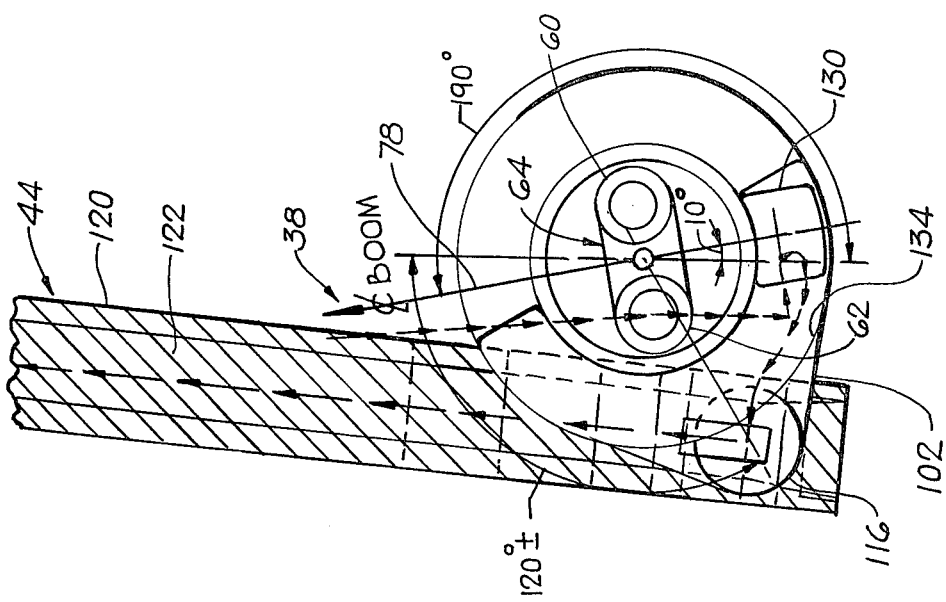

FIG. 5 shows the machine with the boom rotated counterclockwise through more than one half revolution from its central position.

Figure 6:
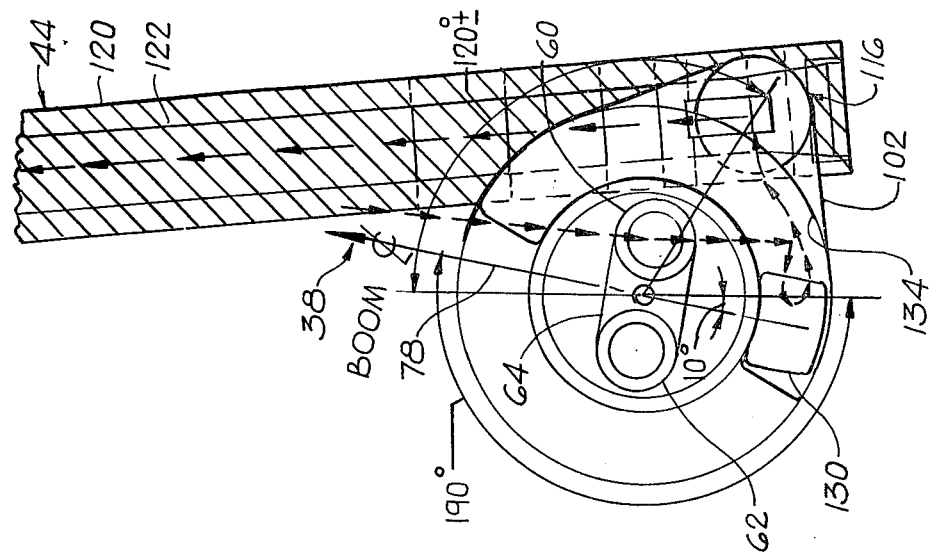
FIGS. 4, 5 and 6 are diagrammatic plan views showing the unloading machine in three different positions, to illustrate the ability of the machine to be swivelled or rotated through a full circle.

FIG. 6 shows the machine with the boom rotated clockwise through more than one half revolution from its center position.

Figures 2, 3:
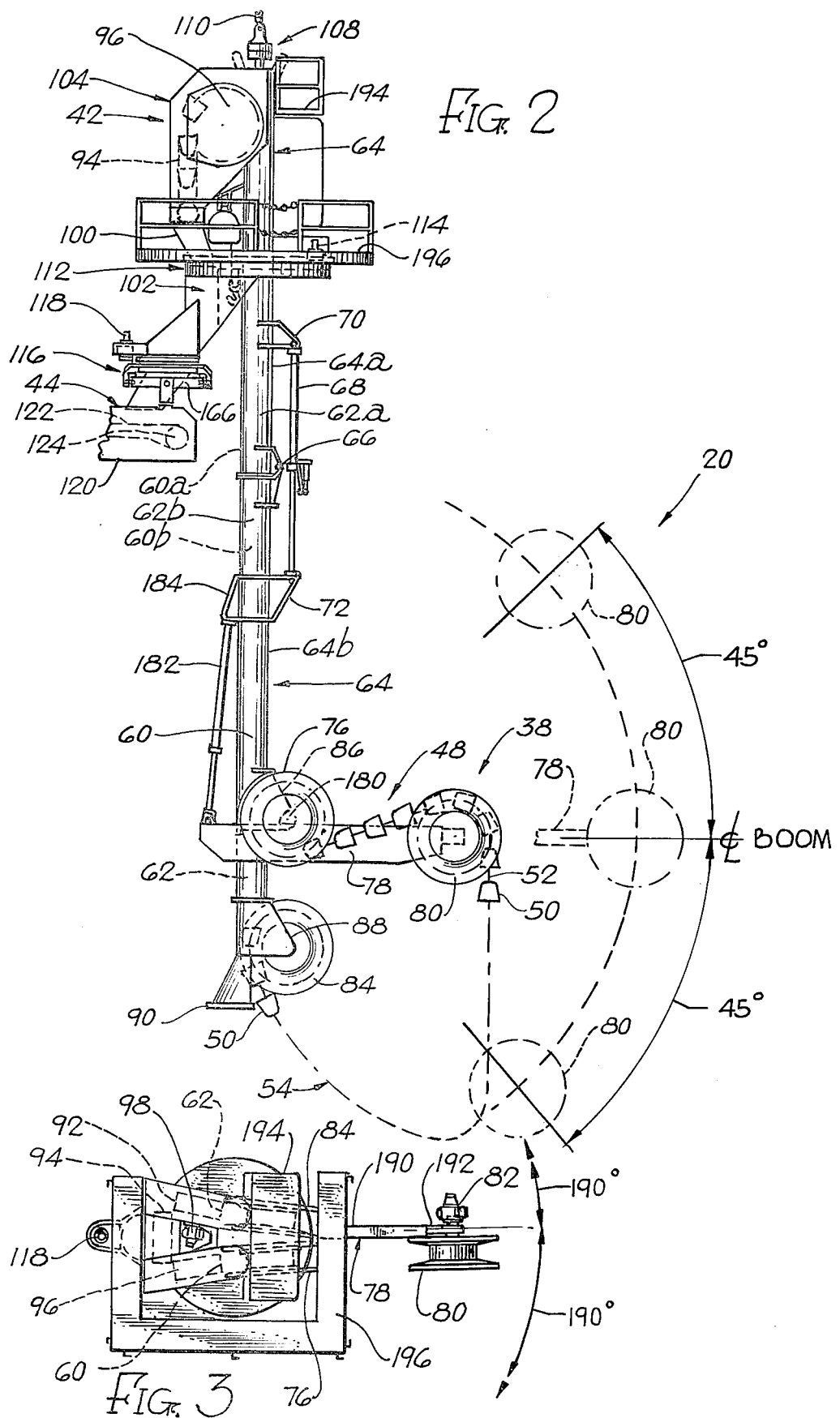
FIG. 2 is a somewhat diagrammatic side elevational view of the unloading machine.
FIG. 3 is a diagrammatic plan view, with certain parts removed for clarity of illustration.

FIG. 7 is a side elevation, somewhat similar to FIG. 2, but showing the machine with its leg folded upwardly.

FIG. 8 is a fragmentary enlarged side elevational view corresponding to a portion of FIG. 2 and showing the first swivel joint, connected between the leg and the second chute of the unloading machine.

FIG. 9 is a fragmentary enlarged elevational sectional view, corresponding to the right hand encircled portion of FIG. 8, and showing details of the first swivel joint.

FIG. 10 is a fragmentary enlarged elevational sectional view, corresponding to the left hand encircled portion of FIG. 9, and showing additional details of the first swivel joint.

FIG. 11 is a fragmentary enlarged elevational sectional view showing one of the antifriction rollers employed in the first swivel joint.

FIG. 12 is a fragmentary enlarged side elevational view, corresponding to a portion of FIG. 2, and showing the second swivel joint, which is connected between the second chute and the belt conveyor.

FIG. 13 is a fragmentary enlarged elevational sectional view corresponding to the right hand encircled portion of FIG. 12 and showing details of the second swivel joint.

FIG. 14 is a fragmentary enlarged elevational sectional view, corresponding to the left hand encircled portion of FIG. 12 and showing additional details of the second swivel joint, including the power drive for such joint.

Figure 15:
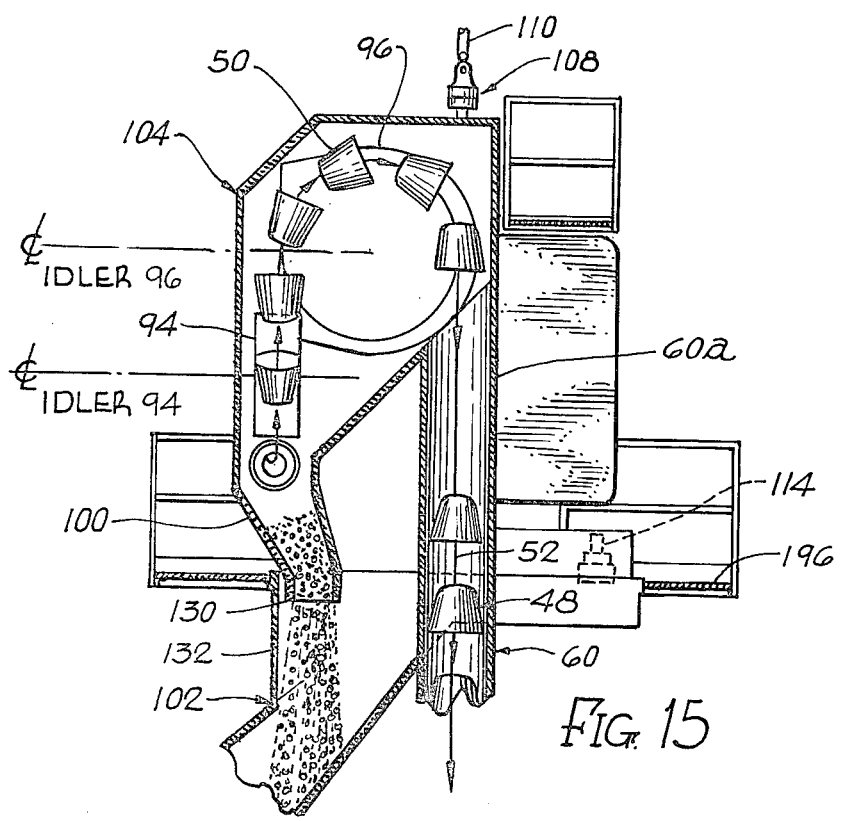
Figure 16:
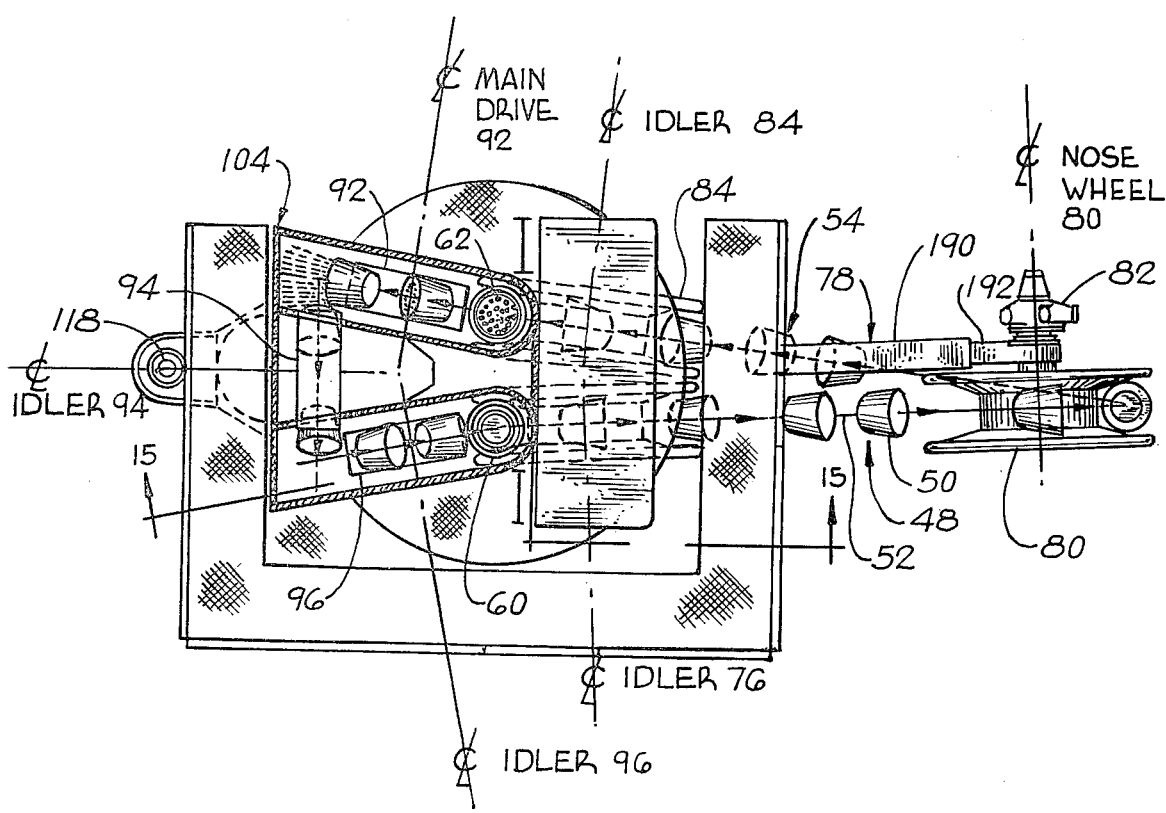

FIG. 15 is a fragmentary enlarged elevational sectional view, corresponding to the upper portion of FIG. 2, and taken generally along the broken line 15—15 in FIG. 16.

FIG. 16 is an enlarged plan view of the unloading machine, partly in horizontal section.

Figure 17:
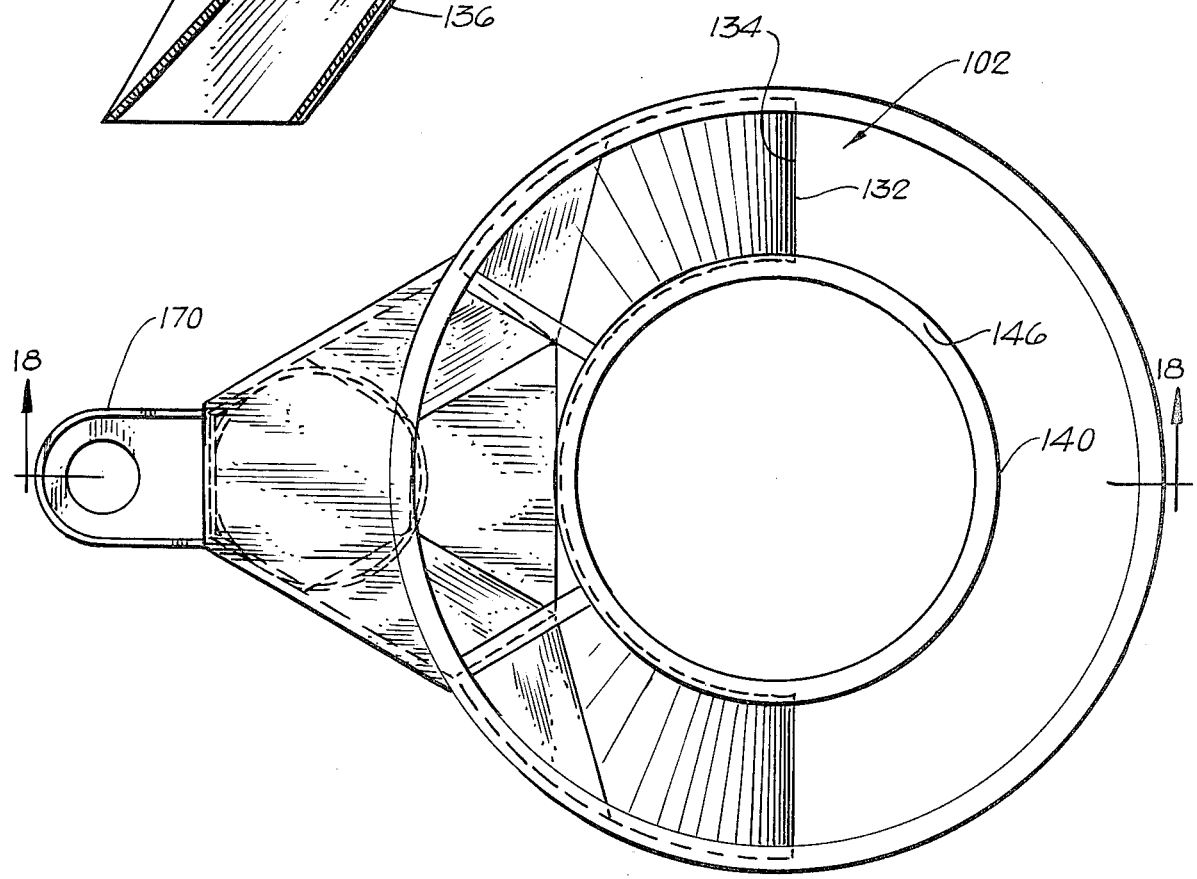

FIG. 17 is an enlarged plan view of the second chute for the unloading machine.

Figure 18:
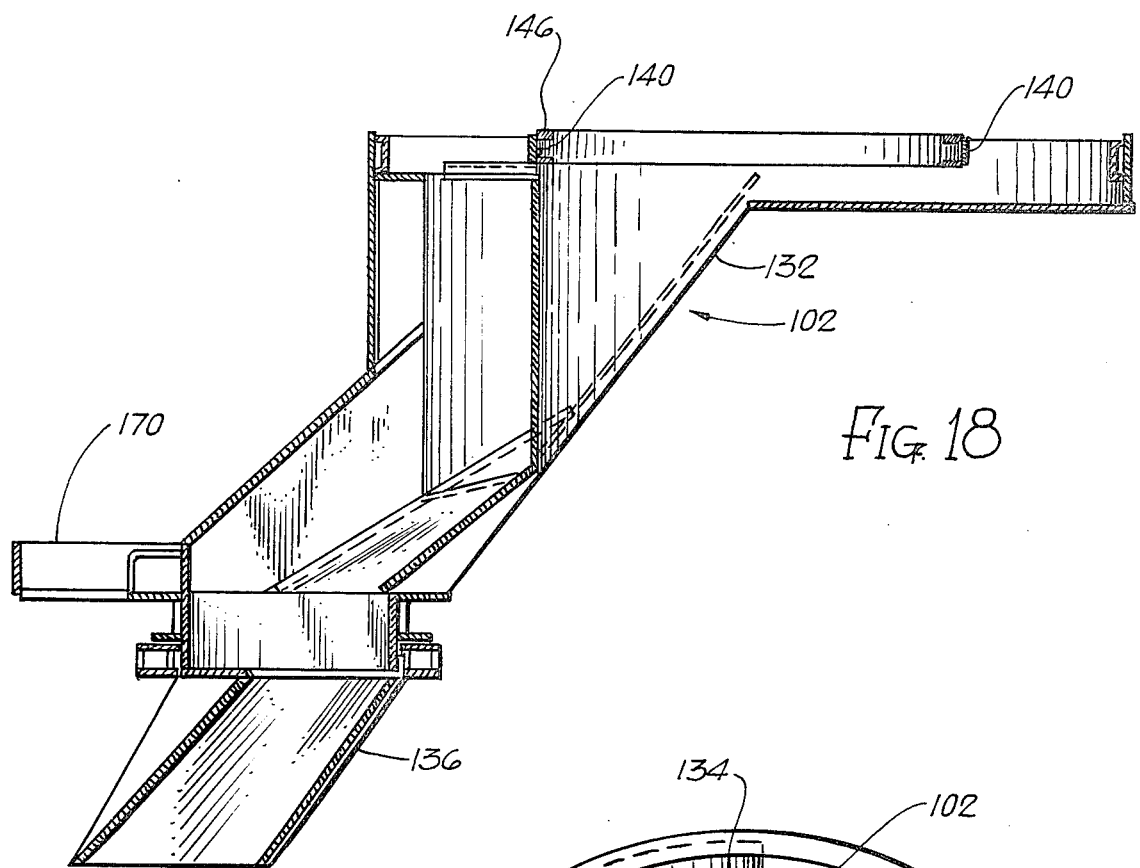

FIG. 18 is an enlarged side elevation of the second chute for the machine.

Figure 1:
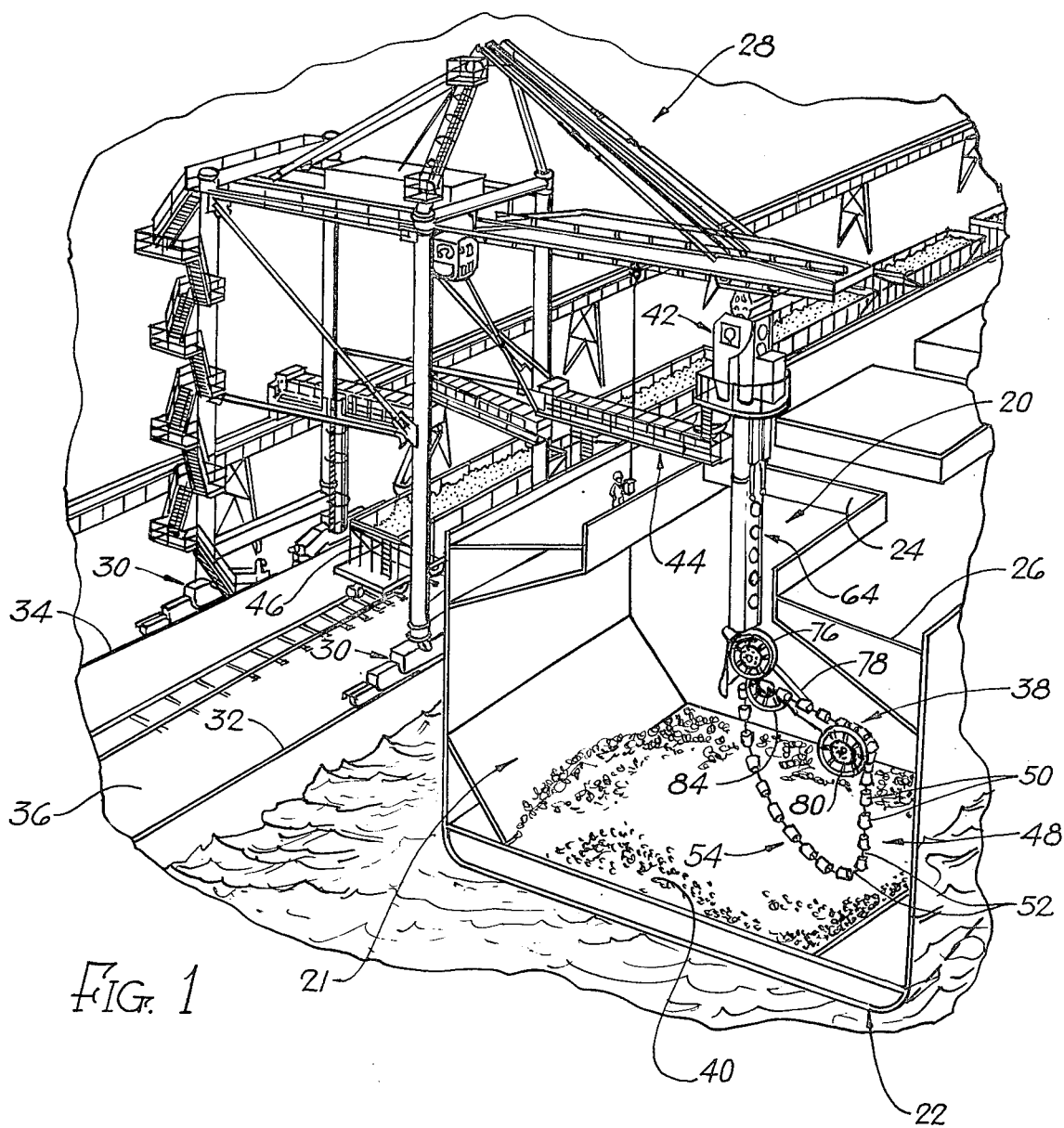
FIG. 1 is a general perspective view of an unloading machine to be described as an illustrative embodiment of the present invention.

As just indicated, the drawings illustrate an unloading machine 20 to be described as an illustrative embodiment of the present invention. The unloading machine 20 will find many applications, but is particularly well adapted for removing bulk materials from ships. Such bulk materials may include granular and powdered materials, and other loose solid materials, such as flakes, chips, pellets or the like. FIG. 1 shows the use of the unloading machine 20 for removing a bulk material from the hold of a ship 22. It will be seen that the unloading machine 20 is inserted into the hold of the ship 22, through a hatch opening 24 in the deck 26 of the ship 22.

The unloading machine 20 may be supported in a variety of ways. As shown in FIG. 1, the unloading machine 20 is suspended from a large gantry crane 28, having wheeled trucks 30, adapted to travel along a pair of parallel supporting rails 32 and 34 on a dock 36 or the like.

The unloading machine includes a digging mechanism 38, adapted to be inserted into the hold of the ship 22, to dig and elevate a bulk material 40. The machine 20 also has a dumping mechanism 42 which dumps the bulk material and transfers it to a conveyor 44, adapted to carry away the bulk material. Any desired disposition may be made of the bulk material. As shown, the bulk material 40 is loaded into railroad cars 46.

The unloading machine 20 is capable of being swivelled through at least a full circle, so that the digging means 38 will have a maximum coverage or reach in the hold of the ship 22.

The unloading machine 20 is also capable of being folded, as shown in FIG. 7, to reduce the height of the machine, so as to facilitate its insertion into and removal from the hold of the ship 22.

The illustrated unloading machine 20 includes an endless bucket train 48 of the general character disclosed and claimed in the previously mentioned Wallace U.S. Pat. Nos. 3,378,130 and 3,688,893. The bucket train 48 has a multiplicity of successive buckets 50 which are distributed along the bucket train 48. The buckets 50 are preferably circular in cross section and are joined together axially by a multiplicity of flexible tension elements 52, which are preferably in the form of flexible cables.

The lowermost portion of flight 54 of the bucket train 48 is suspended along a catenary curve. When the unloading machine 20 is in operation, the bucket train 48 is continuously circulated, so that the buckets 50 travel along such catenary curve. When the catenary bucket flight 54 comes into contact with the bulk material 40, the buckets 50 are dragged along the bulk material, with the result that the buckets dig into the bulk material and carry it upwardly.

The bucket train 48 is guided downwardly into the hold and upwardly out of the hold of the ship 22 by first and second guide tubes 60 and 62 (FIGS. 3 and 16), which are joined together structurally to form a generally vertical leg 64. To provide for the folding of the machine, the leg 64 is formed with upper and lower sections 64a and 64b which are joined by a hinged joint 66, as shown in FIGS. 3 and 7. Similarly, the guide tubes 60 and 62 are formed with upper sections 60a and 62a and lower sections 60b and 62b.

The unloading machine 20 preferably comprises power means for folding and extending the foldable leg 64. Such power means may take the form of the illustrated hydraulic cylinder 68, or some other fluid pressure actuated device. As shown, the hydraulic cylinder 68 is connected between brackets or arms 70 and 72 on the upper and lower sections 64a and 64b of the leg 64. Preferably, the opposite ends of the hydraulic cylinder 68 are pivotally connected to the brackets 70 and 72. When the leg 64 is extended into its lowermost position, as shown in FIG. 2, the upper and lower sections of the guide tubes 60 and 62 are aligned with each other, so that the bucket train 48 will travel smoothly along the guide tubes.

The endless bucket train 48 is supported and guided by a series of conveyor wheels. The bucket train 48 travels downwardly through the first guide tube 60 to a first conveyor wheel 76. After passing under the first conveyor wheel 76, the bucket train travels outwardly along a generally horizontal boom 78. A second conveyor wheel 80 is rotatably mounted on the outer end of the boom 78. The bucket train 48 passes over and is supported by the conveyor wheel 80. Preferably, the conveyor wheel 80 is rotatably driven by rotary power means, such as the illustrated rotary hydraulic motor 82.

The conveyor wheel 80 supports one end of the catenary flight 54 of the bucket train 48. Thus, after the bucket train passes over the conveyor wheel 80, the bucket train travels downwardly, rearwardly and then upwardly along the catenary flight 54 to a third conveyor wheel 84, which guides the bucket train into the lower end of the second guide tube 62. The first and third conveyor wheels 76 and 84 are preferably idler wheels which are caused to rotate by the advancing movement of the bucket train 48. The conveyor wheels 76 and 84 are rotatably mounted on the lower portion of the leg 64. As specifically shown in FIG. 2, the conveyor wheels 76 and 84 are rotatably supported on brackets 86 and 88, secured to the lower portion of the leg 64.

It wil be seen from FIG. 2 that the bucket train 48 passes under the conveyor wheel 84, at the end of the catenary flight 54 of the bucket train 48, and is guided upwardly into the lower end of the guide tube 62. A funnel-like guide 90 may also be provided on the lower end of the guide tube 62 to assist in guiding the bucket train 48 into the lower end of the tube.

As previously indicated, the bulk material 40 is loaded into the buckets 50 of the bucket train 48 by causing the catenary flight 54 of the bucket train to drag along the bulk material 40. In this way, the buckets 50 dig into the bulk material and become filled with the bulk material, so that the bulk material is elevated by the buckets as they travel upwardly through the guide tube 62.

At the upper end of the leg 64, the bucket train 48 passes through the dumping mechanism 42, so that the bulk material is dumped from the buckets 50. As shown in FIGS. 2, 3 and 15, the bucket train 48 travels out of the upper end of the guide tube 62 and over a fourth conveyor wheel 92, which directs the bucket train 48 downwardly to a fifth conveyor wheel 94. The buckets 50 are inverted as they pass downwardly to the fifth conveyor wheel 94, with the result that the bulk material is dumped from the buckets, as illustrated in FIG. 16.

The bucket train 48 passes under the fifth conveyor wheel 94 and is directed upwardly to a sixth conveyor wheel 96. After passing over the conveyor wheel 96, the bucket train 48 is directed downwardly into the upper end of the guide tube 60. The empty buckets 50 travel downwardly through the guide tube 60, as previously described. It will be understood that the bucket train 48 is continuously circulated, so that it repeatedly traverses its endless path, as previously described.

The dumping mechanism 42 may be constructed as disclosed and claimed in the previously mentioned Wallace U.S. Pat. No. 3,688,893. As shown in FIG. 16, the central vertical plane of the conveyor wheel 92 coincides generally with the central vertical plane of the second guide tube 62. The fifth conveyor wheel 94 has a central vertical plane which is transverse to the central vertical plane of the fourth conveyor wheel 92. The central vertical plane of the fifth conveyor wheel 94 is also transverse to the central vertical plane of the sixth conveyor wheel 96. The central vertical plane of the conveyor wheel 96 coincides generally with the central vertical plane of the first guide tube 60.

As to the digging mechanism 38 at the lower end of the leg 64, the central vertical plane of the first conveyor wheel 76 coincides generally with the central vertical plane of the second conveyor wheel 80, and also with the central vertical plane of the first guide tube 60. The central vertical plane of the third conveyor wheel 84 coincides generally with the central vertical plane of the second guide tube 62, and also with the central vertical plane of the catenary flight 54 of the bucket train 48.

The individual conveyor wheels 76, 80, 84, 92, 94 and 96 may be in the form of V-pulleys, as illustrated, or may be in accordance with the constructions disclosed and claimed in the previously mentioned Wallace U.S. Pat. Nos. 3,378,130 and 3,688,893.

The fourth conveyor wheel 92, at the upper end of the guide tube 62, is preferably driven by power means, such as the illustrated rotary hydraulic motor 98, as shown in FIG. 3. The bucket train 48 is continuously circulated by the motor 98, in conjunction with the motor 82, which drives the conveyor wheel 80 at the outer end of the boom 78, as previously described. The fifth and sixth conveyor wheels 94 and 96 are preferably idler wheels, which are caused to rotate by the circulating movement of the bucket train 48.

As shown in FIGS. 2 and 15, the bulk material which is dumped from the buckets 50, as they pass through the dumping mechanism 42, falls into a first chute or hopper 100 and then into a second or transitional chute or hopper 102. The bulk material falls by gravity through the first and second chutes 100 and 102. From the second chute 102, the bulk material drops to the conveyor 44 which takes away the bulk material to any desired facility, such as a transportation facility or a storage facility.

The first chute 100 is generally in the shape of a downwardly tapering funnel and is formed as the lower portion of a housing 104, in which the dumping mechanism 42 is housed. The housing 104 is structurally secured to the upper end of the leg 64.

As previously indicated, the unloading machine 20 is supported for swivelling movement or rotation about a generally vertical axis, through at least one full circle, so as to maximize the coverage or reach of the digging mechanism 38. As shown in FIGS. 2, 7 and 15, the unloading machine 20 is suspended by a swivel joint 108, connected between the upper end of the leg 64 and a hoisting cable or the like 110, whereby the swivel joint 108 is suspended from the crane 28. By means of the crane 28, the entire unloading machine 20 can be relocated horizontally, to any spot within the reach of the crane.

The first chute 100 is fixed to the leg 64 and thus is movable with the leg when it is swivelled about its vertical axis. The first chute 100 is connected to the second chute 102 by a swivel joint 112, whereby the second chute 102 can be swivelled with respect to the leg 64 and the first chute 100. The swivel axis of the swivel joint 112 preferably coincides with the swivel axis of the leg 64, as established by the swivel suspension joint 108. The swivel joint 112 is preferably provided with power actuating means, such as a rotary hydraulic motor 114, adapted to produce relative swivelling movement between the leg 64 and the second chute 102.

A second swivel joint 116 is provided between upper and lower portions of the second chute 102. The swivel joint 116 preferably includes power means, such as a hydraulic motor 118, for producing relative swivelling movement between the upper and lower portions of the second chute 102. The swivel joint 116 preferably has a generally vertical swivel axis which is parallel to the swivel axis of the leg 64, but is displaced laterally relative thereto, so that rotation at the swivel joint 116 produces slewing movement of the conveyor 44, relative to the leg 64.

The conveyor 44 preferably comprises a conveyor structure 120 which supports an endless conveyor belt 122. A pulley 124 to support the conveyor belt 122 is also shown in FIG. 2. The conveyor structure 120 preferably forms an enclosure around the endless conveyor belt 122.

FIGS. 4, 5 and 6 show the ability of the unloading machine 20 to swivel through at least one full circle, so as to maximize the coverage of the digging mechanism 38. FIG. 4 shows the unloading machine 20 in a central position, with the digging mechanism 38 projecting forwardly, as also shown in FIG. 1. The boom 78 projects generally in a forward direction.

As shown in FIG. 5, the machine 20 can be swivelled in a counterclockwise direction, about its vertical swivel axis, through an angle greater than one half circle or 180°. As indicated by the legend in FIG. 5, the machine 20 has been swivelled through a maximum counterclockwise angle of 190°.

To accommodate the swivelling of the unloading machine 20 through more than one half circle, swivelling movement is also produced at both of the swivel joints 112 and 116, at the upper and lower ends of the second or transitional chute 102. Due to the horizontal offset between the swivel axis of the first and second swivel joints 112 and 116, a slewing movement of the conveyor 44 is produced. Between the positions of FIGS. 4 and 5, the swivel axis of the second swivel joint 116 has been shifted counterclockwise through approximately 120°, which is about 70° less than the swivelling or swinging movement of the boom 78. This differential swivelling movement obviates any interference between the conveyor 44 and the leg 64. In FIG. 6, the unloading machine has been swivelled in a clockwise direction from the central position of FIG. 4, through more than one half circle or 180°. As indicated by the legend in FIG. 6, the clockwise swivelling angle is 190°. The boom 78 of the digging mechanism 38 is swung clockwise through a corresponding angle.

Between FIGS. 4 and 6, swivelling movement has also taken place at both swivel joints 112 and 116. The swivel axis of the second swivel joint 116 has been swung clockwise through approximately 120°, or 70° less than the swinging movement of the boom 78. This differential swivelling movement obviates any interference between the conveyor 44 and the leg 64. As shown in FIG. 6, the differential swivelling movement has produced a slewing movement of the conveyor 44.

As illustrated in FIG. 15, the first chute 100 tapers or converges downwardly to a lower spout portion 130 which is adapted to discharge the bulk material into the second or transitional chute 102. To provide for the relative rotation or swivelling movement between the first and second chutes 100 and 102, the second chute 102 has an upper or mouth portion 132 which forms a wide mouth 134, extending through an angle sufficiently wide to accommodate such relative swivelling movement. As shown in FIGS. 4-6, and also in FIG. 17, the mouth 134 is preferably arcuate and C-shaped. Thus, as the unloading machine 20 is swivelled through more than one full circle, as illustrated in FIGS. 4-6, the discharge spout 130 of the first chute is moved along the arcuate extent of the mouth 134 of the second chute 102.

As shown in FIGS. 13 and 18, the upper mouth portion 132 of the second chute 102 tapers or converges downwardly and discharges into a lower spout portion 136 which discharges the bulk material to the conveyor 44.

Additional details of the first swivel joint 112 are shown in FIGS. 8-11. The first swivel joint 112 provides for swivelling movement between the leg 64 and the second chute 102. Antifriction bearing elements are preferably provided in the swivel joint 112, to reduce the effort required to produce such swivelling movement. As specifically shown in FIGS. 9, 10 and 11, a bearing ring or race 140 is secured to the upper end of the second chute 102. The ring 140 is channel-shaped in cross section, as shown. Antifriction roller elements 142 and 144 are engageable with the channel-shaped bearing 140. By means of suitable plates, brackets and shafts, quite a number of both kinds of rollers 142 and 144 are rotatably mounted on the leg 64 of the machine 20. The rollers 142 are rotatable about vertical axes and are engageable with the inner circumference of the bearing ring 140, so as to center the bearing ring relative to the swivel axis of the leg 64. The rollers 144 are rotatable about horizontal radial axes and are engageable with the upper and lower flanges 146 and 148 of the channel-shaped ring 140, so as to transmit vertical thrust between the second chute 102 and the leg 64.

As shown in FIGS. 9–11, a sprocket and chain drive is preferably connected to the hydraulic motor 114 to produce swivelling movement at the swivel joint 112. As specifically shown in FIG. 9, the motor 114 is provided with a rotatable sprocket 150, meshing with a chain 152 which drives a larger sprocket 154, welded or otherwise secured to the outer periphery of the bearing ring 140. Rotation of the motor 114 produces relative swivelling rotation between the ring 140, which is on the second chute 102, and the leg 64 of the unloading machine. The motor 114 is mounted on a horizontal disc or wall 156 which is secured to the leg 64. It will be understood that any other suitable drive mechanism may be substituted for the chain drive.

Details of the second swivel joint 116 are shown in FIGS. 12, 13 and 14. It will be recalled that the second swivel joint 116 provides for relative swivelling rotation between the upper and lower portions 132 and 136 of the second chute 102. The second swivel joint 116 preferably includes antifriction bearing means to minimize the effort required to produce swivelling movement at the joint 116. As specifically shown in FIGS. 13 and 14, the swivel joint 116 comprises bearing rings 160 and 162, with antifriction roller elements 164 therebetween, such roller elements being preferably in the form of balls. The upper bearing ring 160 is connected to the lower portion 136 of the second chute 102, while the lower bearing ring 162 is connected to the upper portion 132 of the second chute 102.

As shown in FIG. 12, a gimbal joint 166 is preferably connected between the bearing ring 160 and the housing 120 of the conveyor 44. It will be understood that the conveyor 44 is suspended in a level position by the gimbal joint 166.

As previously indicated, the hydraulic motor 118 provides power to produce swivelling rotation at the swivel joint 116. As specifically shown in FIGS. 12, 14, 17 and 18, the hydraulic motor 118 is mounted on a frame or bracket 170 secured to the upper portion of the second chute 102. A sprocket and chain drive 172 is preferably connected to the motor 118. Specifically, the motor 118 is provided with a rotatable sprocket 174, meshing with a chain 176 which is strung around a larger sprocket 178, secured to the upper bearing ring 160. It will be recalled that the upper bearing ring 160 is connected to the conveyor 44 through the gimbal joint 166. The rotation of the motor 118 produces relative swivelling rotation at the swivel joint 116, between the upper and lower portions 132 and 136 of the second chute 102.

As shown in FIG. 2, the boom 78 is swingable in a generally vertical direction about a pivot 180 connected to the lower section 64b of the leg 64. The axis of the pivot 180 coincides with the rotary axis of the conveyor wheel 76.

The unloading machine 20 preferably comprises power means for producing such swinging movement of the boom 78. As shown specifically in FIG. 2, such power means may take the form of the hydraulic cylinder 182, connected between the boom 78 and a bracket 184 on the lower section 64b of the leg 64.

The boom 78 may be extensible and retractable in construction, so that the length of the boom 78 can be adjusted. In FIG. 2, the boom 78 is shown in full lines in its retracted position. The extended position of the boom 78 is indicated in broken lines. To provide for such extension and retraction, the boom 78 may have telescopically related inner and outer sections 190 and 192.

As shown in FIG. 2, the unloading machine 20 has access platforms 194 and 196, secured to the upper section 64a of the leg 64. The platform 194 is near the upper end of the leg 64, while the platform 196 is just above the level of the swivel joint 112.

In the use and operation of the unloading machine 20, the machine can be folded to facilitate its insertion into and removal from the hold 21 of a ship 22. The extended position of the machine is shown in FIGS. 1 and 2, while the folded position is shown in FIG. 7. It will be seen that the lower section 64b of the leg 64 is swingable upwardly, relative to the upper section 64a, about the hinged joint 66, between the positions of FIGS. 2 and 7. The hydraulic cylinder 68 provides power for folding and extending the lower section 64b of the leg.

In the folded position of FIG. 7, the boom 78 has also been swung upwardly about the pivot 180, relative to the lower section 64b of the leg 64. Power to produce such swinging movement is provided by the hydraulic cylinder 182.

By folding the machine 20 to the position of FIG. 7, the vertical dimension or height of the machine 20 is greatly reduced, so that the machine is much more compact vertically. In this way, the machine 20 does not have to be hoisted to such a great vertical height, to insert the machine into the hold 21 of the ship 22, and to remove the machine from the hold.

During actual operation, the lower section 64b of the leg 64 is extended to the vertical position of FIG. 2. The bucket train 48 is continuously circulated, so that the bucket train passes downwardly through the first guide tube 60 in the leg 64, under the idler wheel 76, outwardly along the boom 78, over the power driven wheel 80, downward and then upward along the catenary flight 54 of the bucket train 48, under the idler wheel 84, upwardly through the second guide tube 62 in the leg 64, over the power driven wheel 92 (FIG. 3), under the transverse idler wheel 94, over the idler wheel 96, and downwardly through the guide tube 60, to start another circuit.

To dig the bulk material 40, the unloading machine 20 is lowered to bring the catenary flight 54 of the buckets 50 into engagement with the bulk material, so that the buckets are dragged along the bulk material. In this way, the buckets 50 dig into and are filled with the bulk material. The filled buckets 50 travel under the idler wheel 84, upwardly through the second guide tube 62, over the power driven wheel 92, and downwardly to the idler wheel 94. As the buckets 50 are tipped downwardly, the bulk material is dumped out of the buckets, so that the material falls along the first and second chutes 100 and 102 to the conveyor 44, where the bulk material is carried away by the conveyor belt 122.

The engagement between the catenary flight 54 of the bucket train 48 and the bulk material 40 can be regulated by raising and lowering the entire unloading machine 20, or by swinging the boom 78 in a vertical direction, with the power supplied by the hydraulic cylinder 182. The crane 28 is employed to raise and lower the entire machine 20.

To increase the reach of the digging mechanism 38, the boom 78 can be extended between its retracted position, shown in full lines in FIG. 2, and its extended position, indicated in broken lines.

To maximize the coverage of the digging mechanism 38, the unloading machine 20 can be swivelled through a full circle, about the vertical swivel axis of the machine. Such swivelling movement is shown in FIGS. 4, 5 and 6. The unloading machine 20 is supported for swivelling movement by the swivel joint 108, connected between the hoisting cable 110 and the machine. The swivel joints 112 and 116 also allow for such swivelling movement. The swivel joint 112 is connected between the supporting leg 64 of the machine and the second chute 102. The second swivel joint 116 is connected between the upper portion 132 of the second chute 102 and the lower spout portion of the chute 102. The hydraulic motors 114 and 118 provide power means for producing the swivelling movement at the swivel joints 112 and 116. By the coordinated operation of the hydraulic motors 114 and 118, the machine 20 can be swivelled through more than one full circle, as shown in FIGS. 4, 5 and 6. In this way, the digging mechanism 38 can cover a full circle on the bulk material 40 in the hold 21 of the ship 22. Thus, virtually all portions of the bulk material 40 can be reached by the digging catenary flight 54 of the bucket train 48.

FIG. 4 represents the central or front position of the digging mechanism 38, in which the boom 78 projects forwardly, while the conveyor 44 extends rearwardly. By operating the hydraulic motors 114 and 118 of the first and second swivel joints 112 and 116, the leg 64 and the boom 78 can be swivelled, either counterclockwise or clockwise. As shown in FIG. 5, the leg 64 and the boom 78 have been swivelled or rotated counterclockwise through more than one half revolution. The extent of such swivelling rotation may be 190° to 200°. The swivelling rotation at the first swivel joint 112 is supplemented by swivelling rotation about the second swivel joint 116, about its swivel axis which is spaced laterally from the swivel axis of the joint 112.

The swivelling movement at the second swivel joint 116 is produced by the hydraulic motor 118. The swivel movement at the second swivel joint 116 is approximately 110 to 120 degrees clockwise or counterclockwise from the central position shown in FIG. 4. At these limits of movement, the first swivel joint 112 continues the swivelling motion of boom 78 and leg 64 clockwise or counterclockwise until boom 78 has reached a total travel in either direction of 190° to 200° relative to the axis of the take away conveyor 44. This total motion permits the digging machine 38 to be revolved through a range of 380° to 400° in the hold of the ship 22. The swivelling action at the second swivel joint 116 produces slewing movement of the conveyor 44, to the left as shown in FIG. 5, and to the right as shown in FIG. 6, from the central position of FIG. 4.

FIG. 6 represents the swivelling rotation of the leg 64 and the boom 78 to the extreme limit in a clockwise direction from the central position of FIG. 4. The extent of such swiveling movement is in a range of 190° to 200°, or more than one half revolution.

It will be evident from FIGS. 4, 5 and 6 that the total swivelling rotation of the leg 64 and the boom 78 is 360° to 400°, or more than one full revolution, so that the digging mechanism 38 will cover a full circle. This capability plus the ability of the crane 28 to move the unloading machine 20 laterally in any direction and to raise and lower the unloading machine makes it possible to remove virtually all of the bulk material 40 from the hold 21 of the ship 22, with only an absolute minimum of manual cleanup or other assistance.

I claim:

1. An unloading machine for bulk materials, comprising an endless bucket train having a plurality of longitudinally spaced buckets which are circular in cross section, said bucket train including a plurality of flexible tension elements extending axially between the successive buckets in the train, a generally vertical supporting leg including first and second parallel guide tubes for receiving and guiding said bucket train which is movable downwardly within said first guide tube and upwardly within said second guide tube, a vertically swingable boom having an inner end with a pivotal connection to the lower end portion of said leg whereby said boom is swingable vertically about said pivotal connection, a first conveyor wheel supported in the locality of said pivotal connection for causing said bucket train to travel out of the lower end of said first guide tube and then outwardly along said boom, a second conveyor wheel rotatably mounted on the outer end portion of said boom for supporting said bucket train and causing said bucket train to be directed downwardly from the outer end portion of said boom, a third conveyor wheel disposed near the lower end of said second guide tube for directing said bucket train into the lower end of said second guide tube, said bucket train being suspended in a catenary curve between said second and third conveyor wheels for digging a bulk material and carrying it upwardly in said buckets within said second guide tube, a fourth conveyor wheel disposed near the upper end portion of said leg for receiving the bucket train from the upper end of said second guide tube and carrying said bucket train downwardly to dump the bulk material from said buckets, a fifth conveyor wheel for receiving said bucket train from said fourth conveyor wheel and again directing the bucket train upwardly, a sixth conveyor wheel for receiving said bucket train from said fifth conveyor wheel and directing said bucket train downwardly into the upper end of said first guide tube, swivel supporting means for supporting said leg for swivelling rotation about a first generally vertical swivel axis whereby said boom is swingable along a generally horizontal circular path, a first chute secured to said leg and rotatable therewith for receiving the bulk material dumped from said buckets while they are travelling around said fourth conveyor wheel, a second chute having an upper portion for receiving the bulk material from the lower portion of said first chute, said second chute having a lower portion, a first swivel joint connected between said leg and the upper portion of said second chute to provide for swivelling movement of said leg relative to said second chute about said generally vertical axis, a conveyor for receiving and carrying away the bulk material from the lower portion of said second chute, and a second swivel joint connected between the upper and lower portions of said second chute to provide for swivelling rotation therebetween about a second generally vertical axis which is spaced laterally from said first generally vertical swivel axis of said leg, whereby said leg can be swivelled through a wide angle corresponding to at least 360° without producing interference between said leg and said conveyor.

2. An unloading machine according to claim 1, including first power means for producing swivelling movement at said first swivel joint between said leg and said second chute,
and second power means for producing swivelling movement at said second swivel joint between the upper and lower portions of said second chute.

3. An unloading machine according to claim 1, in which said second chute has an upper mouth portion forming an arcuate generally C-shaped mouth extending along an arcuate path centered about said first generally vertical swivel axis whereby said C-shaped mouth is opposite the lower end of said first chute for receiving the bulk material therein over a wide range of relative angular movement between said leg and said second chute.

4. An unloading machine according to claim 3, in which said second chute converges downwardly from said C-shaped mouth to said lower portion which delivers the bulk material to said conveyor.

5. An unloading machine according to claim 4, in which said lower portion of said second chute extends through said second swivel joint to deliver the bulk material to said conveyor throughout the range of swivelling movement of said second swivel joint.

6. An unloading machine according to claim 1, in which said first and second swivel joints include first and second antifriction bearing means to reduce the effort required to produce swivelling movement at said first and second swivel joints.

7. An unloading machine according to claim 1, in which said conveyor includes a generally horizontal conveyor structure supporting an endless conveyor belt for receiving the bulk material from said second chute,
said conveyor structure being connected to the lower portion of said second chute by a gimbal joint.

8. An unloading machine according to claim 1, including first power means for producing swivelling movement at said first swivel joint between said leg and said second chute,
second power means for producing swivelling movement at said second swivel joint between said upper and lower portions of each of said swivel joints including antifriction bearing roller elements and an annular bearing race for engaging said roller elements to reduce the effort required to produce swivelling movement at said first and second swivel joints,
said upper portion of said second chute having a mouth portion forming a generally C-shaped mouth extending along a generally arcuate path centered about said first swivel axis for receiving the bulk material from said first chute over a wide range of relative angular swivelling movement between said first and second chutes,
said upper portion of said second chute converging downwardly from said C-shaped mouth to said lower portion which extends downwardly from said second swivel joint for delivering the bulk material to said conveyor,
said conveyor comprising a generally horizontal conveyor structure supporting an endless conveyor belt for receiving the bulk material from the lower portion of said second chute,
and means including a gimbal joint connected between said lower portion of said second chute and said conveyor structure.

9. An unloading machine for bulk materials, comprising an endless bucket train having a plurality of longitudinally spaced buckets which are circular in cross section,
said bucket train including a plurality of flexible tension elements extending axially between the successive buckets in the train,
a generally vertical supporting leg including first and second parallel guide tubes for receiving and guiding said bucket train which is movable downwardly within said first guide tube and upwardly within said second tube,
a digging mechanism connected to the lower end portion of said leg for causing said bucket train to travel outwardly from the lower end of said first guide tube and then downwardly and inwardly to dig bulk material which is then carried upwardly in said buckets into the lower end of said second guide tube,
a dumping mechanism connected to the upper end portion of said leg for causing the bucket train to travel out of the upper end of said second tube and then downwardly to dump the bulk material from said bucket train which is then returned to the upper end of said first guide tube,
swivel supporting means for supporting said leg for swivelling rotation about a first generally vertical swivel axis whereby said digging mechanism is swingable along a generally horizontal circular path,
a first chute secured to said leg and rotatable therewith for receiving the bulk material dumped from said bucket train by said dumping mechanism,
a second chute having an upper portion for receiving the bulk material from the lower portion of said first chute,
a first swivel joint connected between said leg and the upper portion of said second chute to provide for swivelling movement of said leg relative to said second chute about said generally vertical swivel axis,
said second chute having a lower portion,
a conveyor for receiving and carrying away the bulk material from the lower portion of said second chute,
and a second swivel joint connected between the upper and lower portions of said second chute to provide for swivelling rotation therebetween about a second generally vertical swivel axis which is spaced laterally from said first generally vertical swivel axis of said leg,
whereby said conveyor can be slewed to avoid interference between said conveyor and said leg when said leg is swivelled about its generally vertical swivel axis.

10. An unloading machine according to claim 9, in which said upper portion of said second chute has a mouth portion forming an arcuate generally C-shaped mouth centered about said first swivel axis whereby said mouth is opposite the lower end of said first chute for receiving the bulk material therefrom throughout a wide range of swivelling movement between said leg and said second chute.

11. An unloading machine according to claim 10, in which said upper portion of said second chute converges downwwardly from said C-shaped mouth to said lower portion which extends downwardly from said second swivel joint to deliver the bulk material to said conveyor.

12. An unloading machine according to claim 11, in which said conveyor comprises a generally horizontal conveyor structure supporting an endless conveyor belt for receiving the bulk material from said lower portion of said second chute, and means including a gimbal joint connected between said lower portion of said second chute and said conveyor structure.

13. An unloading machine according to claim 9, in which each of said swivel joints includes anti-friction bearing means for reducing the effect required to produce swivelling movement at said swivel joints.

14. An unloading machine according to claim 9, in which each of said swivel joints includes anti-friction roller elements and an annular bearing race for engaging said roller elements to reduce the effort required to produce swivelling movement at said swivel joints.

15. An unloading machine according to claim 9, including first power means for producing swivelling movement at said first swivel joint between said leg and said second chute, and second power means for producing swivelling movement at said second swivel joint between said upper and lower portions of said second chute.

16. An unloading machine according to claim 9, in which said upper portion of said second chute has a mouth portion forming a generally C-shaped arcuate mouth centered about said first swivel axis and opposite the lower end of said first chute for receiving the bulk material therefrom throughout a wide range swivelling movement of said leg relative to said second chute, said upper portion of said second chute converging downwardly from said C-shaped mouth to said lower portion which extends through said second swivel joint to deliver the bulk material to said conveyor, each of said swivel joints comprising antifriction bearing roller elements and an annular bearing race for engaging said roller elements to reduce the effort required to produce swivelling movement at said swivel joints, said conveyor comprising a conveyor structure supporting an endless conveyor belt for receiving the bulk material from said lower portion of said second chute, said machine comprising first and second power means for producing swivelling movement at said first and second swivel joints, and means including a gimbal joint connected between said lower portion of said second chute and said conveyor structure.

* * * * *

UNITED STATES PATENT AND TRADEMARK OFFICE
CERTIFICATE OF CORRECTION

PATENT NO. : 4,264,003
DATED : April 28, 1981
INVENTOR(S) : Charles B. Gill

It is certified that error appears in the above-identified patent and that said Letters Patent are hereby corrected as shown below:

Column 15, line 19, "effect" should be -- effort --

Signed and Sealed this

Twenty-fifth Day of August 1981

[SEAL]

Attest:

GERALD J. MOSSINGHOFF

Attesting Officer

Commissioner of Patents and Trademarks